United States Patent
Holmquist et al.

(10) Patent No.: US 6,950,444 B1
(45) Date of Patent: Sep. 27, 2005

(54) SYSTEM AND METHOD FOR A ROBUST PREAMBLE AND TRANSMISSION DELIMITING IN A SWITCHED-CARRIER TRANSCEIVER

(75) Inventors: Kurt Holmquist, Largo, FL (US); Joseph Chapman, Seminole, FL (US)

(73) Assignee: Paradyne Corporation, Largo, FL (US)

( * ) Notice: Subject to any disclaimer, the term of this patent is extended or adjusted under 35 U.S.C. 154(b) by 812 days.

(21) Appl. No.: 09/637,185

(22) Filed: Aug. 11, 2000

Related U.S. Application Data

(60) Provisional application No. 60/150,436, filed on Aug. 24, 1999.

(51) Int. Cl.[7] .................................................. H04L 12/56
(52) U.S. Cl. ...................................... 370/476; 370/477
(58) Field of Search ............................. 370/476, 471, 370/472, 474, 477, 389

(56) References Cited

U.S. PATENT DOCUMENTS

| | | | | |
|---|---|---|---|---|
| 5,278,689 A | * | 1/1994 | Gitlin et al. ................ | 359/137 |
| 5,305,384 A | * | 4/1994 | Ashby et al. ................ | 380/29 |
| 5,535,199 A | * | 7/1996 | Amri et al. | |
| 5,822,373 A | * | 10/1998 | Addy ........................ | 375/259 |
| 6,252,865 B1 | | 6/2001 | Walton et al. .............. | 370/335 |
| 6,353,635 B1 | * | 3/2002 | Montague et al. ..... | 375/240.26 |
| 6,651,210 B1 | * | 11/2003 | Trott et al. ................. | 714/758 |

* cited by examiner

Primary Examiner—Kenneth Vanderpuye
(74) Attorney, Agent, or Firm—Thomas, Kayden, Horstemeyer & Risley LLP

(57) ABSTRACT

A method and system for robust delimiting of transmitted messages in switched-carrier operation in which a preamble precedes each communication message with the preamble comprising symbols transmitted at a rate lower than that of the following data. The lower rate symbols of the preamble significantly increase the probability that the decoder will decode the preamble symbols error free. Communication line control information can be included in the robust preamble, thereby ensuring that line control information is reliably transferred over the communication channel. The first symbol of the preamble can be transmitted at the lower symbol rate and at an increased power level, thereby clearly and reliably delimiting the beginning of a transmission. The end of the communication message can be reliably delimited by sending the first symbol containing only bits from a next cell of information at a lower symbol rate and including an extra bit in that symbol. The extra bit can be set to indicate to a receiver whether the last cell of information has just begun.

55 Claims, 10 Drawing Sheets

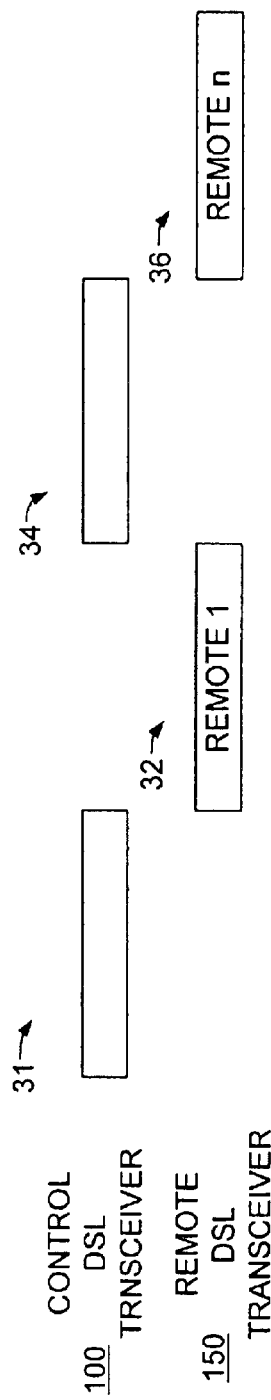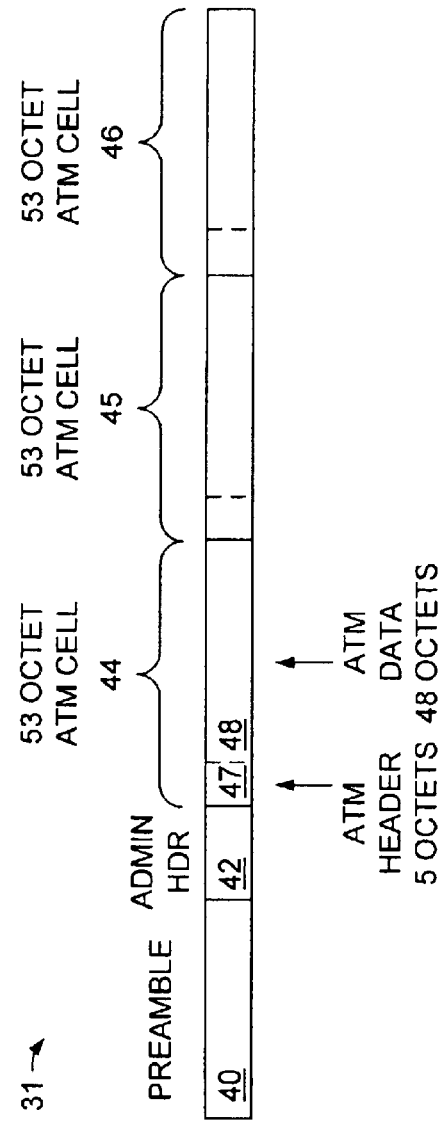

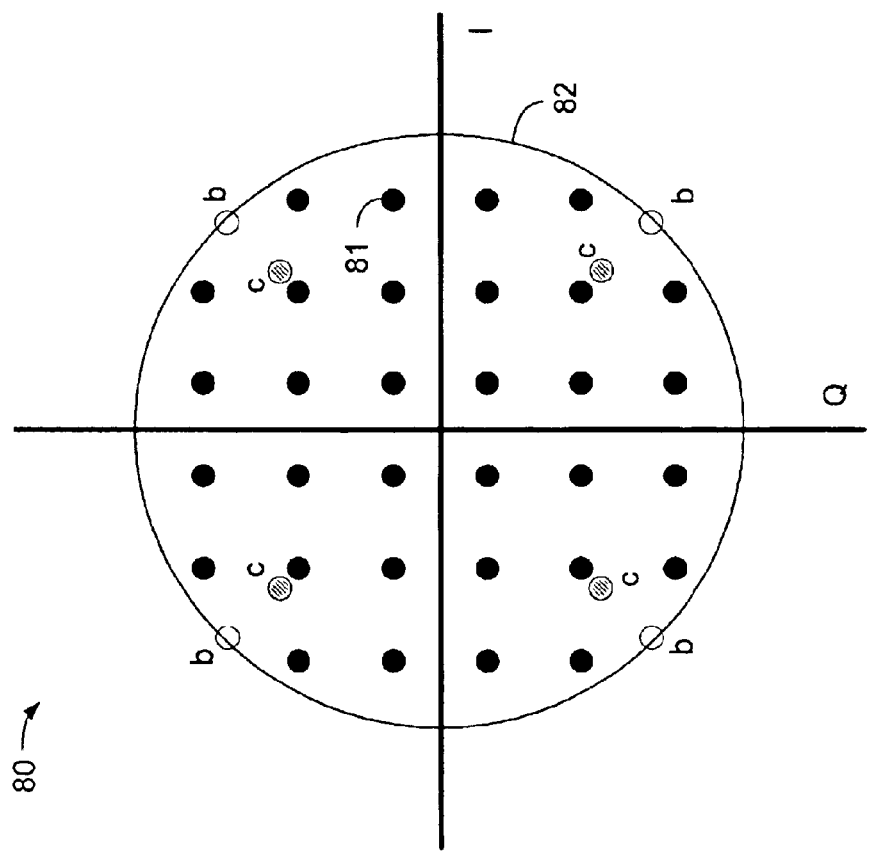

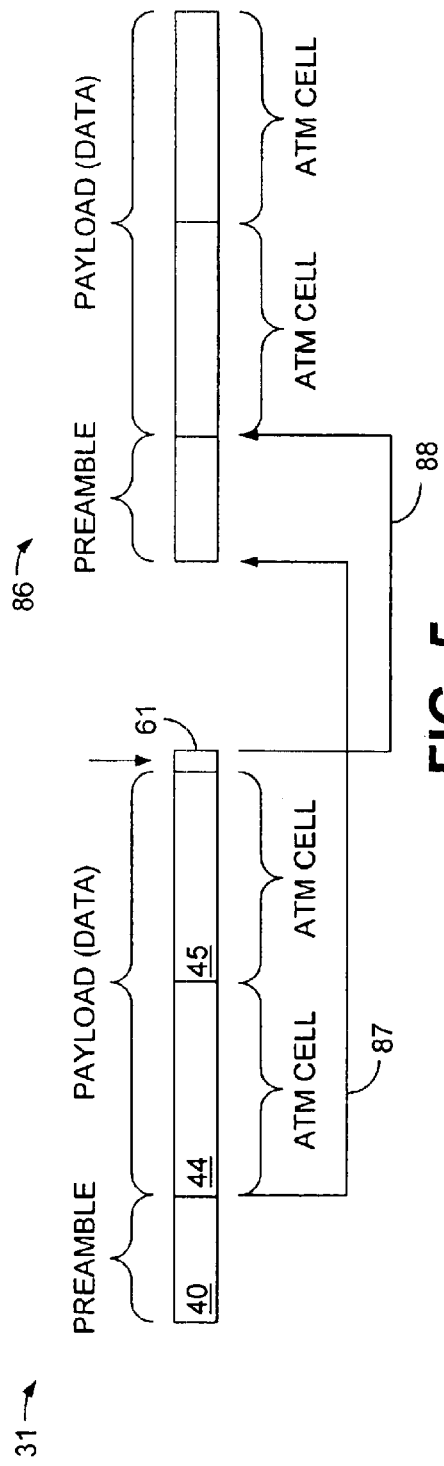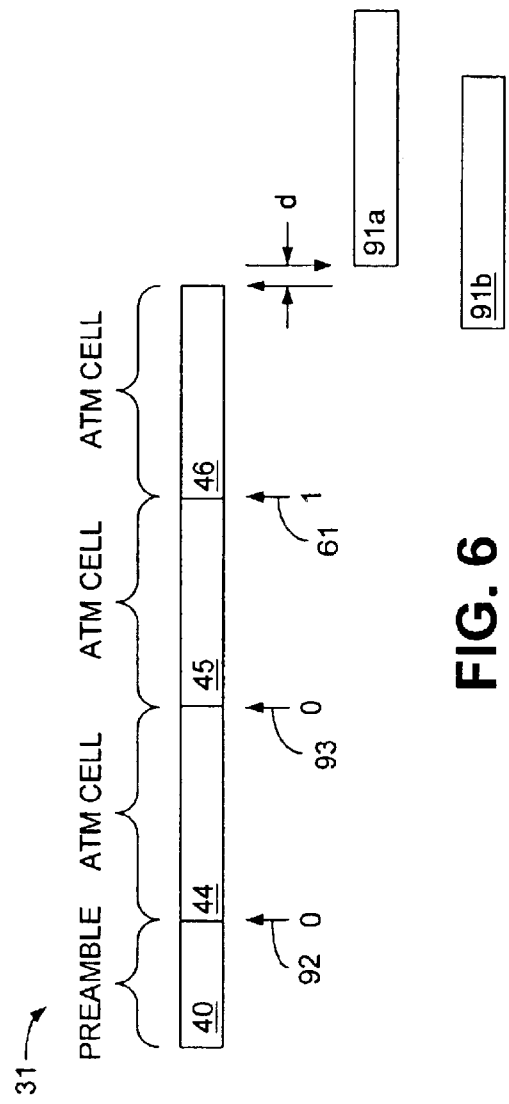

SYSTEM AND METHOD FOR A ROBUST PREAMBLE AND TRANSMISSION DELIMITING IN A SWITCHED-CARRIER TRANSCEIVER

CROSS-REFERENCE TO RELATED APPLICATIONS

This document claims priority to, and the benefit of, the filing date of Provisional Application Ser. No. 60/150,436 entitled "A TECHNIQUE FOR ROBUST SIGNAL DELIMITING AND ENCODING OF CRITICAL LINK CONTROL SIGNALS APPLIED TO TRANSMISSION OF ATM CELLS OVER A DSL USING ADAPTIVE TIME DOMAIN DUPLEX (ATDD)," filed on Aug. 24, 1999, which is hereby incorporated by reference.

TECHNICAL FIELD

The present invention relates generally to communications systems, and more particularly, to a system and method for a robust preamble and transmission delimiting in a switched-carrier transceiver.

BACKGROUND OF THE INVENTION

Data communication typically occurs as the transfer of information from one communication device to another. This is typically accomplished by the use of a modem located at each communication endpoint. In the past, the term modem denoted a piece of communication apparatus that performed a modulation and demodulation function, hence the term "modem". Today, the term modem is typically used to denote any piece of communication apparatus that enables the transfer of data and voice information from one location to another. For example, modem communication systems use many different technologies to perform the transfer of information from one location to another. Digital subscriber line (DSL) technology is one vehicle for such transfer of information. DSL technology uses the widely available subscriber loop, the copper wire pair that extends from a telephone company central office to a residential location, over which communication services, including the exchange of voice and data, may be provisioned. DSL devices can be referred to as modems, or, more accurately, transceivers, which connect the telephone company central office to the user, or remote location typically, referred to as the customer premises. DSL communication devices utilize different types of modulation schemes and achieve widely varying communication rates. However, even the slowest DSL communications devices achieve data rates far in excess of conventional point-to-point modems.

DSL transceivers can be used to provision a variety of communication services using, for example, asynchronous transfer mode (ATM). ATM defines a communication protocol in which 53 octet (byte) cells are used to carry information over the DSL communication channel. The first five octets of the ATM cell are typically used for overhead and the remaining 48 octets are used to carry payload data. When using a switched-carrier transmission methodology, a control transceiver may be connected via the DSL to one or more remote transceivers. In such a communication scheme, the transmission is commonly referred to as "half-duplex," which is defined as two way electronic communication that takes place in only one direction at a time. With only a single remote transceiver on a line, switched-carrier transmission may instead be employed in full-duplex mode (i.e., allowing transmission in both directions simultaneously). In this case, full-duplex operation is typically enabled by employing either echo cancellation or frequency division multiplexing. Hybrid techniques are possible such as one in which there are multiple remote transceivers and communication takes place between the control transceiver and only one remote transceiver in full-duplex fashion. As it relates to the present invention, the common characteristic of these communication techniques is the use of a switched-carrier modulation in which transmitters are deliberately silent for some interval between signal transmissions. For simplicity, the following discussions assume the simplest case of using switch carrier modulation with a half-duplex (also sometimes referred to as "time domain duplex") line usage discipline.

Before the transmission of ATM cells, a preamble containing channel, transmission, address and administrative information may be transmitted by the transceiver. The application of this preamble is sometimes referred to as "framing" the data to be transmitted. Due to the switched-carrier nature of the transmission, silence precedes this preamble and it is of course important for all symbols in this preamble to be received error free. It is also desirable to have the ability to precisely delimit the beginning and end of a transmission to within one transmitted symbol interval. Robustly delimiting the beginning of a message enables a receiving transceiver to reliably begin immediately decoding the message at the correct symbol. Likewise, robustly delimiting the end of a message enables a receiving transceiver to reliably decode the entire message through the final symbol and then stopping so as to prevent data loss and to prevent the inclusion of any false data. Furthermore, by communicating the end of message indicator to a receiving transceiver prior to the actual end of the message, line turnaround time (i.e., idle time on the line between transmissions) can be reduced, thereby increasing the effective use of the available line bandwidth.

Because the most efficient signal constellation encoding cannot allocate signal space to silence, it is impractical to reliably discriminate silence from a signal when analyzing only a single symbol encoding an arbitrary data value.

To improve message delimiting, existing techniques use special marker symbols whose symbol indices are greater than those used to encode data. At N bits per symbol (bps) data is encoded using symbol indices $0$ through $2^N-1$. The special symbols use indices $2^N$ and above. While these special marker symbols are useful for marking the beginning and end of a transmission, their placement at the outer edges of a constellation raises the peak signal, thus increasing the peak to average ratio (PAR) across all data rates by as much as 4 dB. Unfortunately, discrimination of special symbols has the same error threshold as does decoding of data.

Thus, it would be desirable to have a robust manner in which to detect the beginning and end of a transmission so that line bandwidth can be most efficiently allocated. Furthermore, it would be desirable to robustly transmit a message preamble including control information thereby greatly improving the probability that the preamble is received error free.

SUMMARY OF THE INVENTION

The present invention provides an improved system and method for robustly delimiting a message transmission in switched-carrier communication systems. The invention provides a method and system for transmission of a message preamble in which transmission of the preamble is more robust than the data. In this manner, the beginning and end of a transmission can be robustly delimited and channel control information can be reliably conveyed to a receiving transceiver.

The system of the present invention uses a novel header application, which enables the transport of ATM, or any other data, efficiently and economically over a communications channel, such as a DSL communications channel.

Briefly described, in architecture, the system for robust transmission delimiting comprises a communication message including a preamble including a plurality of bits representing communication link control information, and an encoder configured to encode the preamble bits into a plurality of symbol indices. The symbol indices are encoded at a lower bit per symbol rate relative to the maximum rate capable of being supported over a communication channel.

In another aspect, the invention is a system for delimiting the end of a transmission. The system takes a communication message segmented into a plurality of fixed size units, each fixed size unit including a plurality of bits, and includes an encoder configured to encode the plurality of bits into a plurality of symbol indices at a first data rate. The encoder is also configured to encode the first symbol index containing only bits from each fixed size unit at a data rate lower than that of the first data rate.

The present invention can also be viewed as a method for robust transmission delimiting comprising the steps of applying a preamble to a communication message, the preamble including a plurality of bits representing communication link control information, and encoding the preamble bits into a plurality of symbol indices. The symbol indices are encoded at a lower bit per symbol rate relative to the maximum rate capable of being transmitted over a communication channel.

In another aspect, the invention is a method for delimiting the end of a transmission comprising the steps of segmenting a communication message into a plurality of fixed size units, each unit including a plurality of bits, encoding a plurality of the bits in the cells into a plurality of symbol indices, the symbol indices being encoded at a first rate, and encoding the first symbol index containing only bits from each fixed size unit at a rate lower than that of the first rate.

BRIEF DESCRIPTION OF THE DRAWINGS

The invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

Figure 1:
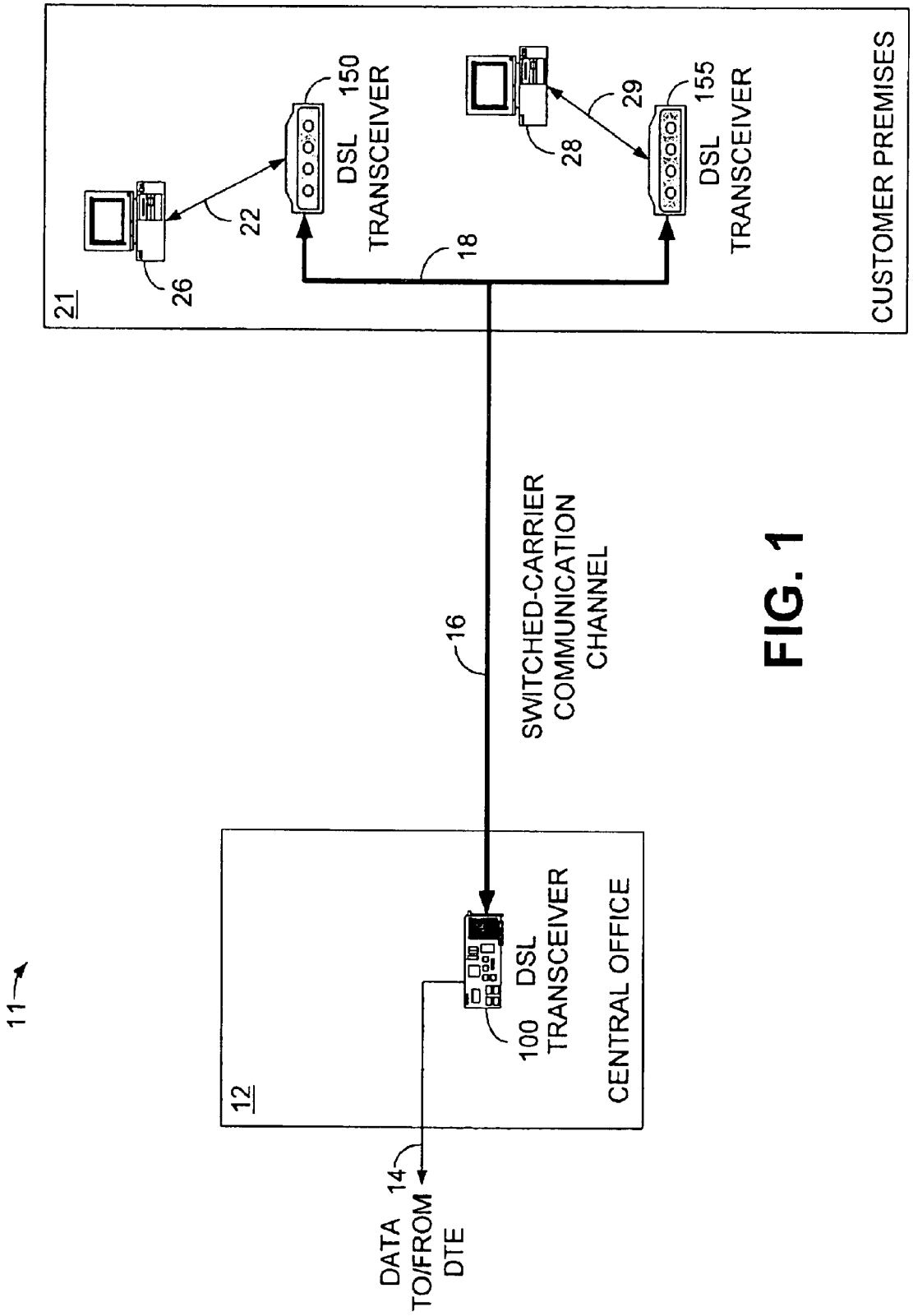
FIG. 1 is a schematic view illustrating a switched-carrier half-duplex communication environment, in which DSL transceivers containing the present invention reside.
Figure 3A:
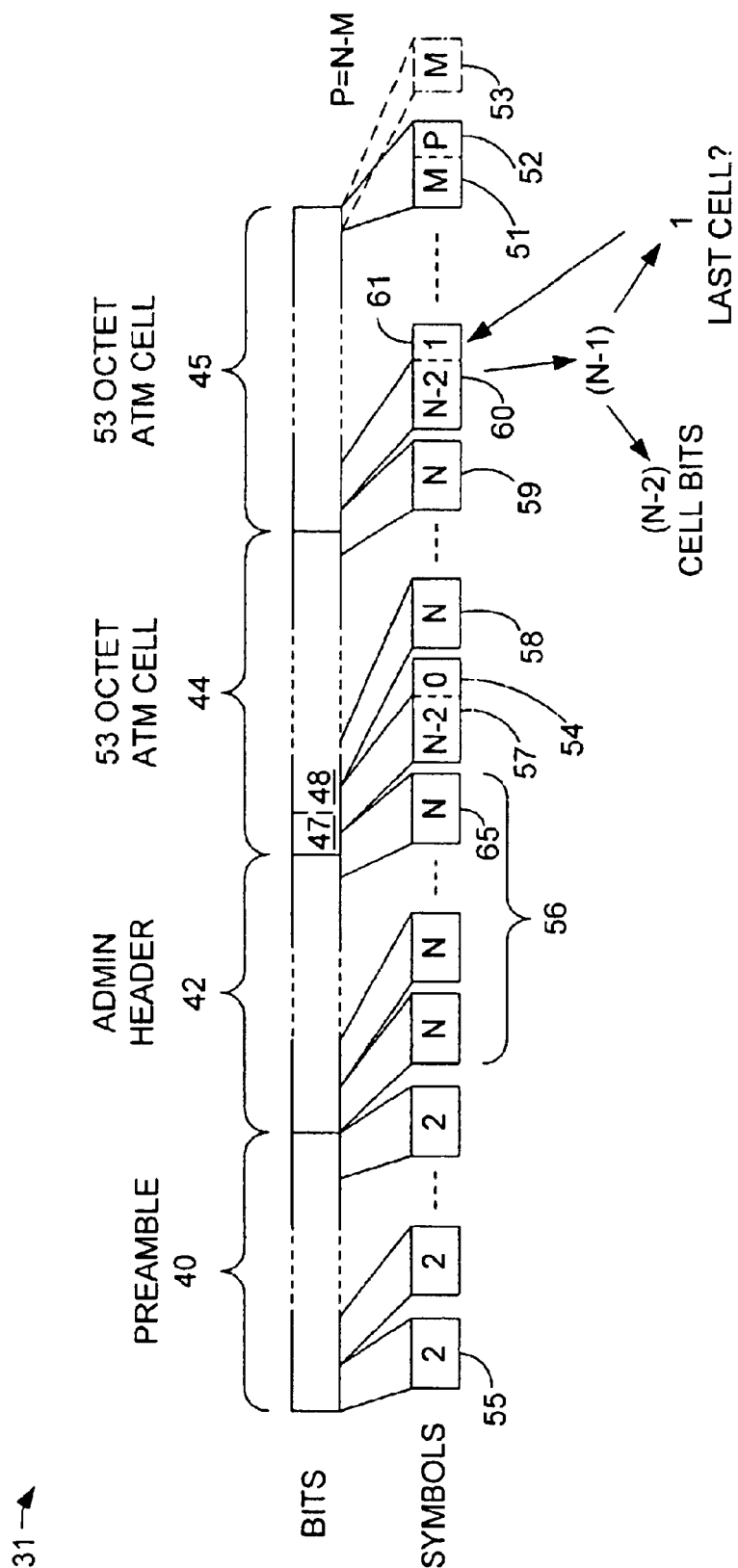
Figure 3B:
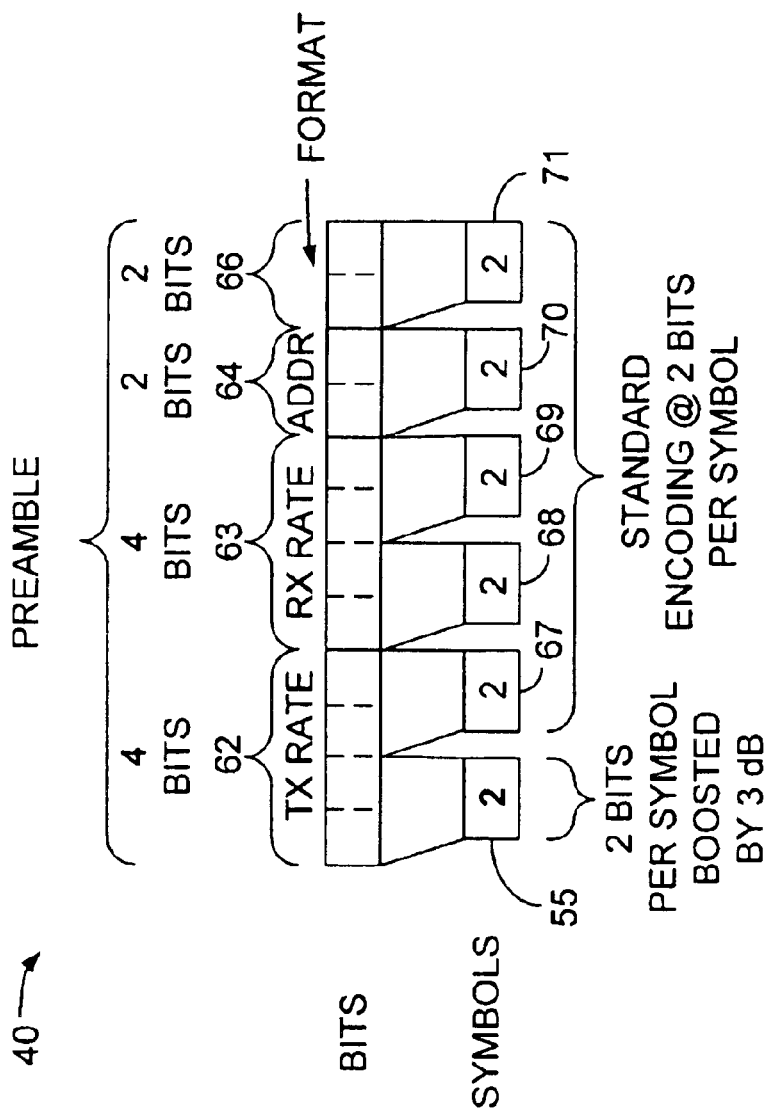
Figure 4A:
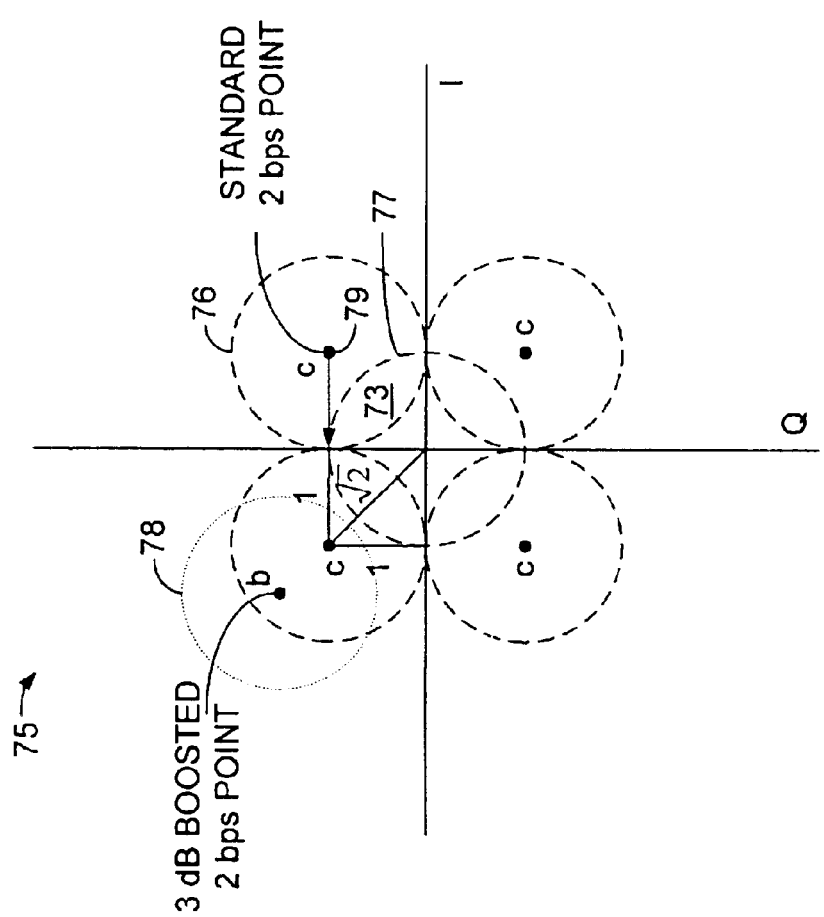
Figure 7:
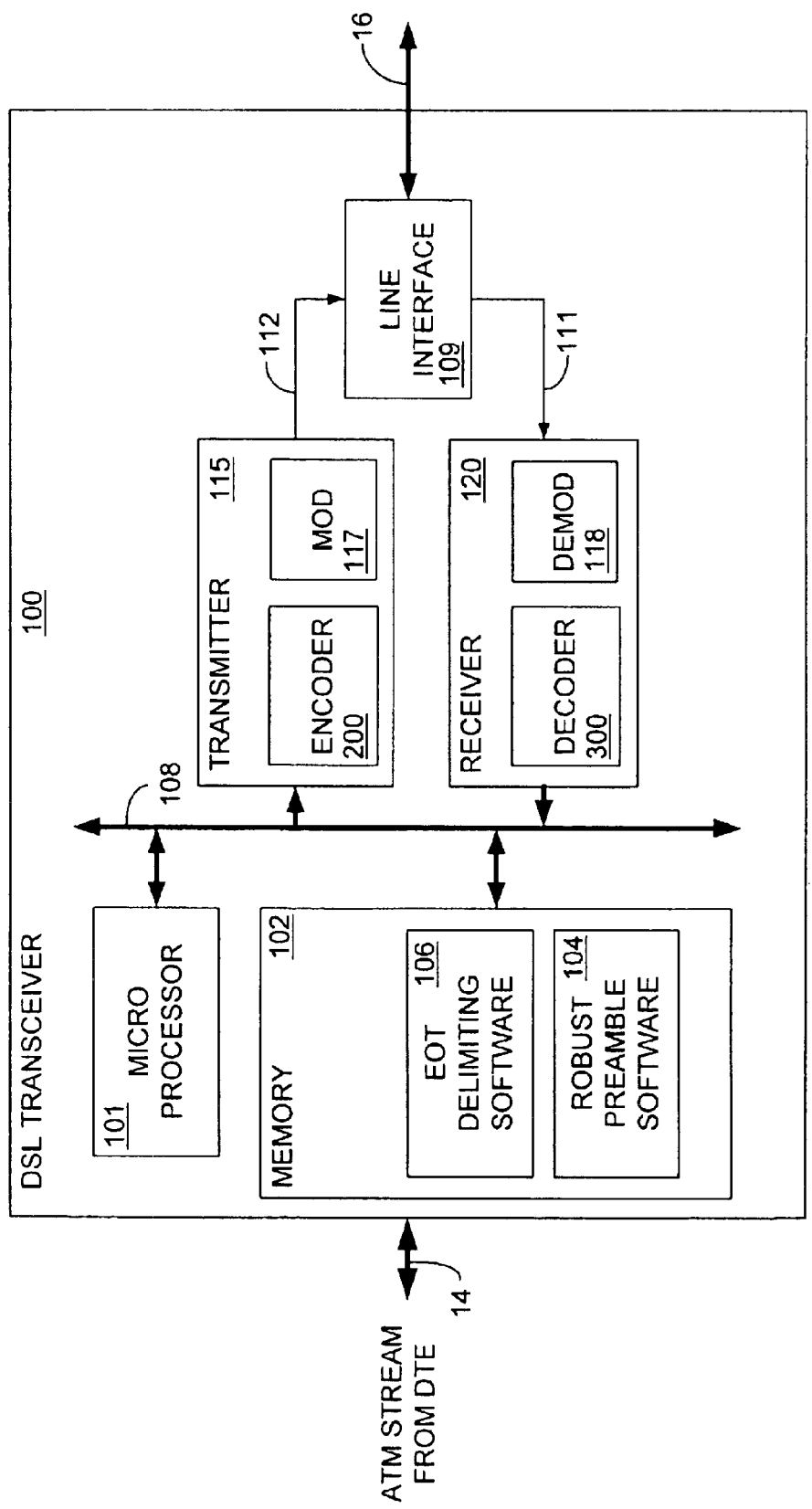
Figure 8:
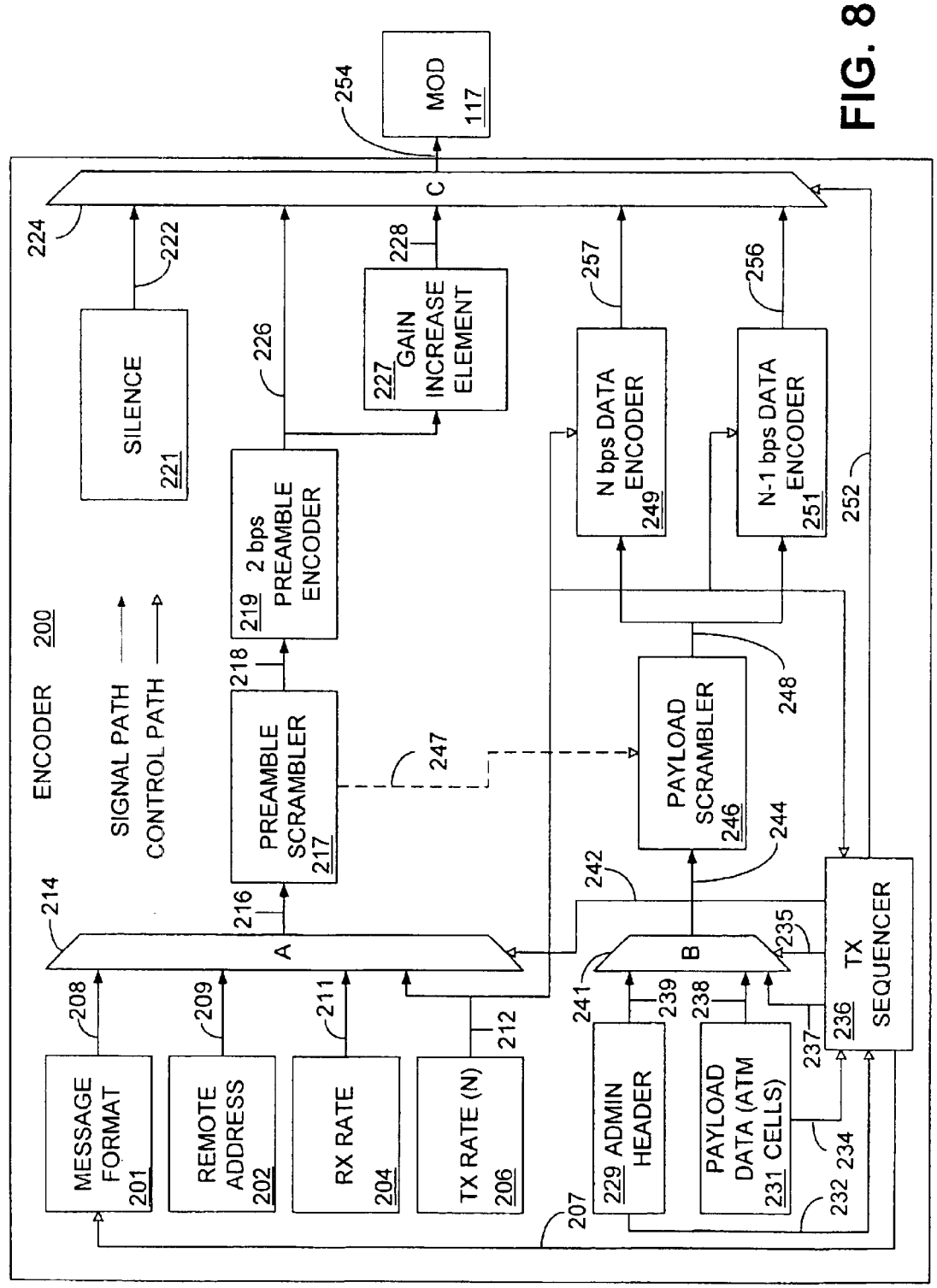

FIB 2A is an illustration of the time-domain duplex communication methodology employed by the DSL transceivers of FIG. 1;

FIG. 2B is a schematic view illustrating, in further detail, a communication message of FIG. 2A;

FIG. 3A is a schematic view illustrating the bit to symbol relationship of the communication message of FIG. 2B;

FIG. 3B is a schematic view illustrating, in further detail, the preamble of FIG. 3A;

FIG. 4A is a graphical illustration representing a two (2) bit per symbol signal space constellation and the increased energy symbol of FIG. 3B;

FIG. 4B is a graphical illustration showing an exemplar grouping of constellation points representing different bit per symbol rates in accordance with an aspect of the invention;

FIG. 5 is a schematic view illustrating the communication message of FIG. 3A and a technique for scrambling that further improves reliable transmission of the message preamble;

FIG. 6 is a schematic view illustrating the communication message of FIG. 3A and the reduced line turn around delay made possible by an aspect of the invention;

FIG. 7 is a block diagram illustrating the control DSL transceiver of FIG. 1;

FIG. 8 is a block diagram illustrating the encoder of FIG. 7; and

Figure 9:
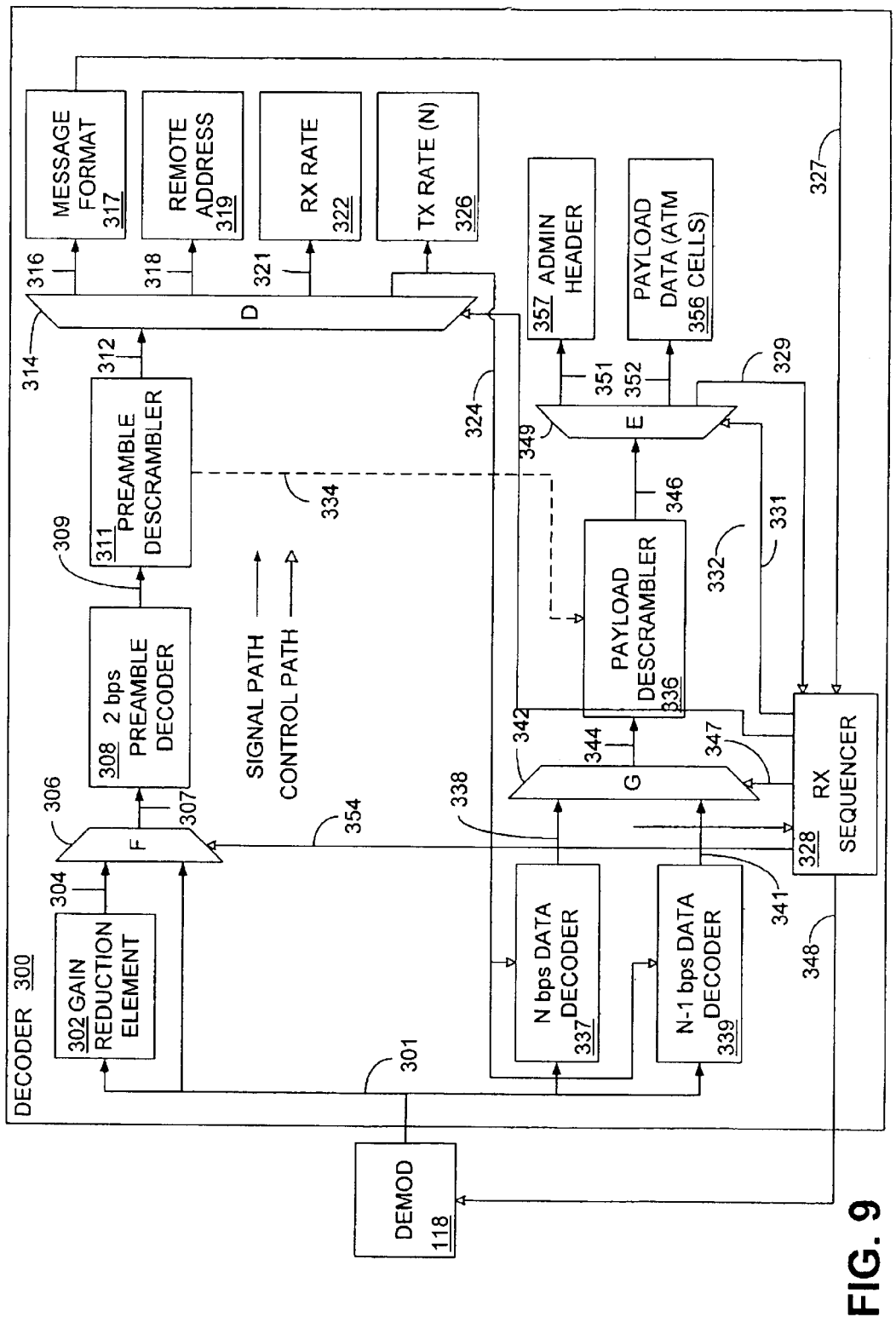

FIG. 9 is a block diagram illustrating the decoder of FIG. 7.

DETAILED DESCRIPTION OF THE INVENTION

Although, described with particular reference to the transmission of ATM cells over a DSL communication channel, the system and method for a robust preamble and transmission delimiting can be implemented to transmit all forms of data in any switched-carrier transmission system in which it is desirable to send a robust preamble and to robustly delimit the beginning and end of each communication message.

Furthermore, the system and method for a robust preamble and transmission delimiting can be implemented in software, hardware, or a combination thereof. In a preferred embodiment(s), selected portions of the system and method for a robust preamble and transmission delimiting are implemented in hardware and software. The hardware portion of the invention can be implemented using specialized hardware logic. The software portion can be stored in a memory and be executed by a suitable instruction execution system (microprocessor). The hardware implementation of the system and method for a robust preamble and transmission delimiting can include any or a combination of the following technologies, which are all well known in the art: an discrete logic circuit(s) having logic gates for implementing logic functions upon data signals, an application specific integrated circuit having appropriate logic gates, a programmable gate array(s) (PGA), a field programmable gate array (FPGA), etc Furthermore, the robust preamble and transmission delimiting software, which comprises an ordered listing of executable instructions for implementing logical functions, can be embodied in any computer-readable medium. Moreover, use by or in connection with an instruction execution system, apparatus, or device, such as a computer-based system, processor-containing system, or other system that can fetch the instructions from the instruction execution system, apparatus, or device and execute the instructions.

In the context of this document, a "computer-readable medium" can be any means that can contain, store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium. More specific examples (a non-exhaustive list) of the computer-readable medium would include the following: a electrical connection (electronic) having one or more wires, a portable computer diskette (magnetic), a random access memory (RAM), a read-only memory (ROM), an erasable programmable read-only memory (EPROM or Flash memory) (magnetic), an optical fiber (optical), and a portable compact disc read-only memory (CDROM) (optical). Note that the computer-readable medium could even be paper or another suitable medium upon which the program is printed. As the program can be electronically captured, via for instance optical scanning of the paper or other medium, then compiled, interpreted or otherwise processed in a suitable manner if necessary, and then stored in a computer memory.

Turning now to the drawings, FIG. 1 is a schematic view illustrating a switched-carrier half-duplex communication environment 1, in which DSL transceivers containing the present invention reside. Although the invention will be described below in a half-duplex communication environment, the DSL transceivers containing the invention may be used in a switched-carrier full-duplex environment as well. In such a case, full-duplex operation may be enabled using technologies such as echo cancellation or frequency division multiplexing. Communication environment 11, includes central office 12 connected via communication channel 16 to customer premises 21. Communication channel 16 can be any physical medium over which communications signals can be exchanged, and in the preferred embodiment, is the copper wire pair that extends from a telephone company central office to an end-user location, such as a home or office. Central office 12 includes DSL transceiver 100 connected to communication channel 16. DSL transceiver 100 processes data via connection 14. DSL transceiver 100 exchanges data via connection 14 with any data terminal equipment (DTE), such as a computer or data terminal.

Customer premises 21 includes one or more DSL transceivers 150 connected via internal infrastructure wiring 18 to communication channel 16. The infrastructure wiring 18 can be, for example but not limited to, the telephone wiring within a private residence or within an office. DSL transceivers 150 can be connected to a variety of telecommunication devices located at customer premises 21. For example, DSL transceiver 150 connects via connection 22 to a personal computer 26. Although additional DSL transceivers can be located at customer premises 21, an exemplar one of which is indicated using reference numeral 155, the aspects of the invention to be discussed below are also applicable if only one DSL transceiver 150 is located at customer premises 21. In the example given in FIG. 1, DSL transceiver 155 connects to computer 28 via connection 29.

The DSL transceiver 100 located at central office 12 is considered a "control device" and the DSL transceiver 150 located at customer premises 21 is considered a "remote device." This is so because the control DSL transceiver 100 controls the communication sessions by periodically polling each remote DSL transceiver 150 to determine whether the remote device has information to transmit. Regardless of the number of DSL transceivers located at customer premises 21, the method of communication between DSL transceiver 100 located at central office 12 and DSL transceiver 150 located at customer premises 21 is half-duplex in nature, sometimes referred to as adaptive time-domain duplex, or data driven half-duplex, unless the above-mentioned technologies such as echo cancellation or frequency division multiplexing allow full-duplex operation between the control transceiver 100 and one remote transceiver 150. This means that during any time period only one DSL transceiver may transmit at any time. In the situation in which there are multiple DSL transceivers located at customer premises 21, the DSL transceiver 100 located at central office 12 periodically polls each DSL transceiver located at customer premises 21 at an appropriate time to determine whether any of the remotely located DSL transceivers have any information to transmit to central office 12. If only one DSL transceiver 150 is located at customer premises 21, the communication method may be half-duplex in nature or conventional full-duplex techniques may be used (e.g., using either frequency division multiplexing or echo cancellation).

FIG. 2A is a schematic view illustrating the time-domain duplex communication methodology between a control DSL transceiver 100 and a remote DSL transceiver 150. When a control DSL transceiver 100 desires to send a message to a remote DSL transceiver 150 the control DSL transceiver 100 sends a communication message 31 including a preamble and any information that is to be transmitted. There are times when the communication message may include only a preamble. After the transmission of communication message 31, the remote DSL transceiver to which communication message 31 is addressed (in this example remote DSL transceiver 150) responds with communication message 32. After the remote DSL transceiver 150 completes the transmission of communication message 32, the control DSL transceiver 100 is now free to send another communication message 34 to either the same remote DSL transceiver 150 or, if present, a different remote DSL transceiver, such as DSL transceiver 155 (remote "n") of FIG. 1. As illustrated in FIG. 2A, remote DSL transceiver "n" responds with communication message 36. In this manner, the communication methodology between control DSL transceiver 100 and all remote DSL transceivers 150, 155. . . n, is switched-carrier and time-domain duplexed.

FIG. 2B is a schematic view illustrating, in further detail, the communication message 31 of FIG. 2A. Communication message 31 begins with preamble 40 followed by optional administrative header 42. In accordance with an aspect of the invention, all communication messages, regardless of the content, begin with preamble 40. Administrative header 42 is optional and can be used to send information that is neither part of the preamble 40 or of any data to follow. For example, the administrative header 42 could convey a description of noise level conditions at one end so the other end may opt to increase or reduce the power level of its transmission as necessary. Likewise, the administrative header 42 sent by a remote transceiver could contain information regarding the amount of payload information that the remote transceiver is ready to transmit and its relative priorities so that the control transceiver could alter the amount of time that this remote transceiver is given to transmit its data (relative to any other transceivers connected to the line). When the payload data comprises ATM cells, the control transceiver could use messages conveyed by the administrative header 42 to direct remote devices to activate or deactivate various ATM virtual circuits.

If data is included in communication message 31, one or more ATM cells follow the optional administrative header 42. Although illustrated using three ATM cells, 44, 45 and 46, there are situations in which no ATM cells, or for that matter, no information of any kind, follows preamble 40. In the case in which information does follow preamble 40, and for purposes of illustration only, ATM cells 44, 45 and 46 are each standard 53 octet ATM cells. For example, ATM cell 44 includes 5 octet ATM header 47 and 48 octets of ATM data 48. ATM cells 45 and 46 are identical in structure to ATM cell 44. ATM cells 44, 45 and 46 adhere to the conventional ATM cell structure as defined in standardized ATM literature. It should be noted that optional administrative header 42 does not follow the standard ATM cell format and that administrative header 42 can be any number of octets in length. As known to those having ordinary skill in the art, an octet comprises 8 bits of information. Although described with particular reference to the transportation of ATM cells over a DSL communication channel, the principles of the invention are applicable to all fixed length communication messages.

FIG. 3A is a schematic view illustrating the bit to symbol relationship of the communication message 31 of FIG. 2B. In accordance with an aspect of the invention, preamble 40 is placed at the beginning of every transmission (i.e., each communication message 31). Preamble 40 is followed by optional administrative header 42, which is then followed, if there is data to transmit, by one or more 53 octet ATM cell 44 and 45. Although illustrated using only two ATM cells, any number of ATM cells may follow preamble 40 and, if included, optional administrative header 42. The ATM cells are a stream of data information represented as a series of bits that are placed into each ATM cell.

The preamble 40 is also a series of bits, which are encoded into a number of communication symbols. Symbols are the representation of the bits to be transmitted, and are represented as signal points in a signal space constellation (to be described below with respect to FIGS. 4A and 4B). In accordance with one aspect of the invention, each of the bits in preamble 40 are encoded into symbols, an exemplar one of which is illustrated using reference numeral 55, at the lowest available bit rate that can be transmitted over the communication channel 16. For purposes of illustration only, the symbols that encode the bits in the preamble 40 shown in FIG. 3A are encoded at a rate of two (2) bits per symbol. However, any number of bits per symbol lower than that of the normally transmitted data rate can be used so long as the symbol rate allows a receiving device to more reliably decode those symbols. For example, if the normal data rate is five (5) bits per symbol, then a symbol rate of two (2) bits per symbol has a significantly (approximately 9 dB) higher noise margin than the five (5) bit per symbol data rate, thereby allowing the symbols that are encoded at the lower rate of two (2) bits per symbol to be very robustly and reliably decoded by a receiving device. In this manner, the preamble 40, which is sent at the beginning of every communication message 31, can be made sufficiently robust so that the chance that it will always be received error free is greatly increased. Although very robust, there are still situations in which the symbols into which the preamble bits are encoded can be corrupted. However, in accordance with another aspect of the invention, because the preamble 40 is sent at the beginning of every communication message 31, even if the preamble 40 is corrupted, only data following that preamble may be affected, i.e., lost due to corruption, if certain bits of the preamble are corrupted.

In accordance with another aspect of the invention, the first symbol 55 representing the first bits in the preamble 40 can be sent using an increased power level, thereby clearly and robustly delimiting the beginning of the communication message 31. The effect of this increased power level symbol 55 will be explained in greater detail below with respect to FIGS. 4A and 4B.

Still referring to FIG. 3A, if an administrative header 42 is present in communication message 31, then the bits that are contained in administrative header 42 will be encoded at a symbol rate of "N" bits per symbol, where N is the normal data rate. The normal data rate can be any data rate, for example, but not limited to, a value between 2 and 12 (inclusive) bits per symbol. For purposes of illustration, and for simplicity of explanation, the normal symbol rate can be five bits per symbol. This is represented by the group of symbols 56 into which all the bits of administrative header 42 and a portion of the bits of header 47 of ATM cell 44 are encoded.

In accordance with another aspect of the invention, the first symbol used to encode bits from a particular cell that contains bits only from that cell will be encoded at a data rate lower than that of the standard data rate used for all other bits of each cell. For example, symbol 57 is the first symbol that contains bits only from ATM cell 44. The last symbol 65 of symbol group 56 contains bits from both administrative header 42 and ATM cell 44. Likewise, symbol 60 is the first symbol containing only bits from ATM cell 45. In accordance with this aspect of the invention, the symbols 57 and 60 will be encoded at a data rate that is two (2) bits per symbol lower than that of the preceding symbol (represented by N−2 where N is the number of bits per symbol used for encoding all other bits of the administrative header and ATM cells.) In this manner, because of the fixed length 53 octet ATM cells, by simple bit counting, the receiver will always know the first symbol encoding bits from a cell that contains only bits from this cell, and therefore has the special encoding described herein. These N−2 bits of the cell data are grouped for transmission and an additional bit (bit 54 for cell 44 or bit 61 for cell 45) is added for a total of N−1 bits encoded into symbol 57 or 60, respectively. This group of N−1 bits, represented by symbol 57 or 60, is encoded into a symbol and scaled for transmission with the scaling normally applied when encoding at N−1 bits per symbol. The extra bit 54 or 61 indicates whether or not the cell just started (ATM cell 44 or 45, respectively) is the last cell of the transmission. The extra bit 61 in symbol 60 is set to logic one to indicate that ATM cell 45 is the last cell of the transmission so that the receiver will know at the beginning of the receipt of ATM cell 45 that ATM cell 45 is the last cell in the transmission. For the same reason, bit 54 in symbol 57 set to zero so that the receiver will know that at least one more cell follows cell 44.

If N=2, then no bits are taken from the cell to encode the next symbol (since N−2=0). Since N−1=1, the next symbol contains just one bit, which is the last cell indicator. This effectively inserts an entire extra symbol in each cell. Nevertheless, the same encoding/decoding logic for this special symbol applies for any value of N≦2.

Once the receiver knows that a particular cell is the last cell in the message, by simple counting it can readily identify the symbol that contains the last bits of the last cell. This is represented in FIG. 3A as symbol 51 or optionally symbol 53. Since the number of bits remaining to be transmitted in the last symbol (M) can be less than N, a modified encoding technique is preferable for this symbol. One option is to add one or more padding bits (P) 52 so that M+P=N. Another option is to encode the last group of bits at M bits per symbol as represented by symbol 53. This has the advantage of increased robustness for the transmission of these bits.

For simplicity, the following discussion does not address this second technique. Having recognized the last symbol of the transmission, the receiver does not attempt to demodulate and decode the signal on the line following this symbol since the transmitting station must now be sending silence.

It should be noted that although described as being encoded at N−1 bits per symbol, the symbols 57 and 60 containing the additional last cell indicator bit can be encoded at any symbol rate lower than that of the standard transmission rate (N bits per symbol). For example, if N is five (5), the specially encoded symbols could also be encoded at N−2 or three (3) bits per symbol so that they contain two (2) bits of cell data plus the last cell indicator bit. In this manner, the receiver can clearly and reliably decode the symbol 60, thereby providing a robust and reliable end of message delimiter.

In accordance with this aspect of the invention, and to be described in further detail with respect to FIG. 3B, it is also desirable to have the ability to indicate that a message contains only an administrative header 42. In order to accomplish this, the first symbol containing data from the administrative header 42 can also be encoded using the higher noise margin N−1 bit per symbol encoding technique described above. For example, the first N−2 bits of the administrative header 42 can be combined with a last cell bit (such as bit 61 of symbol 60) and be encoded at the N−1 bit per symbol rate. This can provide the extra bit to indicate whether or not one or more ATM cells follow administrative header 42. An alternative technique is to simply include a bit in the preamble 40 that indicates whether an administrative header 40 follows the preamble. For simplicity, it has been assumed that this alternative technique is used with respect to FIG. 3A and in the following discussion.

Because each ATM cell is the smallest unit of a payload of ATM cells, and because all ATM cells have the same length, the first symbol of each cell that carries only bits of that cell can readily be identified. Because these bits are transmitted using the specially encoded symbol carrying two fewer bits than normal (as described above), the length of each cell is effectively increased by two bits. In some cases this can result in one extra symbol being needed to transmit the cell. In other cases an additional cell is not needed because the spare bits are available anyway (and would have ended up as the padding bits (P) 52 in FIG. 3A). Because the cells may be transmitted contiguously as a bit stream, the addition of one extra symbol may provide sufficient extra bits to cover the opening symbol of multiple following cells. For example, at eight (8) bits per symbol, in one (1) extra symbol is needed to cover the end of frame signaling overhead to transmit up to four (4) cells.

FIG. 3B is a schematic view illustrating, in further detail, the exemplar preamble 40 of FIG. 3A. The bit stream of preamble 40 comprises four (4) bits 62 that include information regarding the transmit rate (in bits per symbol) used to encode data following preamble 40 (the data comprising the optional administrative header and optional ATM cells), four (4) bits 63 that include information regarding the rate (also in bits per symbol) that the receiver is capable of receiving, two (2) bits 64 that identify the address of a remote DSL transceiver if the control DSL transceiver is transmitting (if a remote DSL transceiver is transmitting, then these two (2) bits 64 can represent the address of that remote DSL transceiver) and two (2) bits 66, which can be used to communicate the format of the message to follow. For example, the two (2) bits 66 can be used to advise a receiving device whether an administrative header 42 follows the preamble 40, whether ATM cells follow the preamble, whether both follow or whether only the preamble is being transmitted. The four (4) bits provided by symbols 55 and 67 and by symbols 68 and 69 can each encode as many as sixteen data encoding rates.

As mentioned above, the preamble 40 is sent at the beginning of each transmission. The twelve (12) bits that comprise the preamble 40 are encoded into symbols 55, 67, 68, 69, 70 and 71 in accordance with that described above. In accordance with an aspect of the invention, all of the symbols in preamble, 40 are encoded at a low bit per symbol rate. In this example, all of the symbols are encoded at a rate of two (2) bits per symbol, however, any other low bit per symbol rate can be used with similar results. The low bit per symbol rate ensures a high signal-to-noise ratio for these symbols, thereby significantly decreasing the probability that these preamble symbols will be corrupted by noise on the communication channel. The payload data (administrative header and ATM cells) would typically be encoded at N bits per symbol only if transmission at this N bit per symbol rate has an acceptably low rate of errors (based on line length, signal strength, noise, distortion and other impairments that may be present). Otherwise, data transmission efficiency would suffer. Therefore, encoding the preamble at less than N bits per symbol allows a corresponding improvement in the reliability of transmitting this information such that it is highly unlikely to be corrupted. Since very few bits are needed to convey the information carried in the preamble, a very low rate can be used without seriously reducing the overall transmission efficiency.

In accordance with another aspect of the invention, the first symbol 55 is encoded at a rate of two (2) bits per symbol and has its energy increased to a point at which noise on the communication channel is unlikely to cause a receiver to erroneously interpret the first symbol 55 as silence. Likewise the increased energy makes it unlikely that noise on the communication channel will cause the receiver to erroneously interpret an interval of the silence that precedes each message as the starting symbol of a message. It has been found that an energy increase of 3dB is sufficient. This aspect of the invention will be described in greater detail below with respect to FIGS. 4A and 4B. In this manner, the beginning of each transmission can be clearly and robustly delimited. The remainder of the symbols 67, 68, 69, 70 and 71 that represent the bits in preamble 40 are all encoded at two (2) bits per symbol, but do not have their energy increased.

The four (4) transmit rate bits 62 inform a receiving DSL transceiver of the transmit rate of the information to follow the preamble 40. Sending this information in every message has significant benefits. It provides the transmitting transceiver the option of changing the encoding rate for the payload from one message to the next. Messages containing information that has been determined to be of high priority can be transmitted using a lower number of bits per symbol to improve the chances of its being received without errors. If the communications system intermittently has a reduced throughput demand, the transceivers may instantly reduce their data rates to improve robustness without adversely affecting real throughput. Finally, if a severe noise condition (such as an impulse caused by plain old telephone service (POTS) ringing signals on a subscriber line 16) happens to corrupt one or both of the symbols 55 and 67 that encode the transmit rate, only the payload data in this message will be improperly decoded. The receiver's memory of a corrupted rate value lasts only until the next transmission begins. This allows the transmit rate to potentially be changed for every message while at the same time avoiding the complexities of providing fail-safe communication of the rate, such as through use of an automatic repeat request (ARQ) protocol, that would be needed if the rate is sent only when it is changed.

The receive rate bits 63 allow the transmitting device to communicate to the receiving device the maximum receive rate at which the transmitting device can receive. Inherently included in these receive rate bits 63 are commands that instruct the opposite device to either increase or decrease its transmit rate. This allows the responding transceiver to instantly modify the rate it uses for its next transmission to accommodate changes in the signal quality that have been detected at the opposite end of the line.

In accordance with an aspect of the invention, the address bits 64 need only be used when the control DSL transceiver 100 is communicating with a plurality of remote DSL transceivers in what is commonly referred to as "multi-point" mode. When communicating in "multi-point" mode the address bits 64 include either the address of the remote DSL transceiver 150 that is to transmit next (if the transmission is sent by the control DSL transceiver 100) or the address of the responding remote DSL transceiver 150 (if the transmission is sent by the remote DSL transceiver 150). Sending these bits 64 at the lower bit rate of the preamble reduces the likelihood of a remote transceiver 150 not responding or of the incorrect remote transceiver 150 responding to a message from the control transceiver 100. Frequent occurrence of either of these two types of errors could adversely affect the overall data transmission efficiency of the line.

The format bits 66 indicate whether the optional administrative header 42 is being sent, whether one or more ATM cells are being sent, or whether both or neither are being sent. As described previously, the receiver uses this information in conjunction with the transmit rate from bits 62 to identify the special symbols at the start of each ATM cell and to determine the symbol that is the last in the message. Robust transmission of this information at the start of each message allows the transmitter to dynamically modify the message format as needed from one message to the next. Should one of the format bits be corrupted by an abnormally severe noise event, the "damage" is restricted to the current message only. To operate reliably, the receiver could have a "back up" method of recognizing the end of a message such as through detecting loss of signal energy for an extended duration.

FIG. 4A is a graphical illustration representing a two (2) bit per symbol signal space constellation and the increased energy symbol of FIG. 3B. The constellation points labeled "c" represent the points in a standard 2 bit per symbol constellation. For each constellation point "c" transmitted, the effect of noise can make the point appear to a receiver to have been moved with respect to where it was when it was transmitted. The dashed circle 76 surrounding constellation point 79 represents the space within which noise may move the point and still have the point reliably decoded by the receiver. The point 79 appears in a different place at the decoder due to noise induced in the communications channel 16. Each of the points "c" have a space about which they can move and still be reliably decoded by the receiver.

The circle 77 encloses the area surrounding the origin of the in-phase-(horizontal) and quadrature (vertical) axes of FIG. 4A about which an interval of silence (no constellation point) can be moved by the same additive noise that can affect signal points. This additive noise could cause the silence to be interpreted by the decoder as one of the constellation points in a two (2) bit per symbol constellation due to the overlap of the decoding discrimination threshold circles 76 and 77. As shown, the circle 76 and the circle 77 have sufficient overlap in region 73 so that silence can easily be interpreted as one of the signal points "c". Conversely, one of the signal points "c" could also be interpreted by the decoder as silence.

For efficient operation, it is desirable that the beginning and end of each transmission be robustly and precisely identified (to within one (1) symbol interval). The beginning and end of each transmission are preceded and followed by silence on the line. Because the most efficient constellation encoding cannot allocate signal space to silence, it is impractical to reliably discriminate silence from signal when analyzing only a single symbol. In other words, it would be undesirable for silence that occurs before a message or after a message to be interpreted as a constellation point "c", and it would be undesirable for a constellation point "c" to be interpreted as silence. As mentioned above, this is possible due to the effect of noise altering the position of the constellation signal points "c" or the position of silence.

In accordance with an aspect of the invention, the first symbol (symbol 55 of FIG. 3B) in the preamble 40 is transmitted with increased energy, thereby increasing the probability that it will be reliably detected by the decoder of the receiving device. In this manner, the beginning of each transmission is clearly and robustly delimited. The signal point "b" in FIG. 4A is an exemplar one of four (4) two (2) bit per symbol constellation points that are transmitted at an increased energy level. While other increases may provide useful, a 3 dB increase is typically sufficient and does not increase the ratio of peak power to average power (PAR) of the transmitted signal. As illustrated, the signal point "b" is enclosed by dotted circle 78, within which the point "b" may move due to noise on the communication channel 16 and still be reliably decoded by the receiver. As shown, there is no overlap between circle 78 and circle 77. Accordingly, by boosting the energy of the first symbol (symbol 55 of FIG. 3B) transmitted in a communication message (31 of FIG. 3A), there is a significantly higher probability that the boosted symbol will be reliably decoded and not be mistaken for silence. Nor will silence be mistaken for this boosted energy first symbol. Preferably, the receiver places the threshold to discriminate signal from noise at one unit from the origin as shown by circle 77 in FIG. 4A.

FIG. 4B is a graphical illustration showing an exemplar grouping of constellation points representing different bit per symbol rates in accordance with an aspect of the invention. For example purposes only, assuming that normal data is encoded at five (5) bits per symbol, the black constellation points, an exemplar of one of which is illustrated using reference numeral 81, represent data encoded at five (5) bits per symbol. In accordance with an aspect of the invention, all the symbols in the preamble 40 are encoded at a rate of two (2) bits per symbol and are illustrated by the four (4) constellation points labeled "c" in FIG. 4B. These two (2) bit per symbol constellation points provide a higher signal-to-noise ratio (high margin) than do the normal data encoded at five (5) bits per symbol. This increased margin increases the probability that the receiver will reliably decode all the symbols in the preamble.

In accordance with another aspect of the invention, the four constellation points labeled "b" in FIG. 4B represent the first symbol (symbol 55 of FIGS. 3A and 3B), which energy is boosted by 3 dB. In this manner, the constellation points "b" representing the boosted symbol 55 of FIG. 3A and 3B will robustly and reliably communicate the beginning of a transmission. Circle 82 represents the maximum signal level of any symbols as the number of bits per symbol becomes arbitrarily large, but the average power of the transmitted signal is the same as it is for either the five (5) bits per symbol (81) or the two (2) bits per symbol (points "c") constellations shown. Therefore, as illustrated by circle 82, the instantaneous power required by the boosted symbol points "b" is not any higher than that used to send the normal data at any bits per symbol value. In this manner, the boosted symbol represented by constellation points "b" can be used to reliably indicate the start of a message without requiring a higher transmit level capability than that needed for normal data transmission. The non-boosted two (2) bit per symbol constellation points indicated as "c" (having a significantly higher signal-to-noise ratio than that of the normal five (5) bit per symbol data) are used to transmit all symbols of the preamble after the first symbol.

FIG. 5 is a schematic view illustrating the communication message 31 of FIG. 3A and another aspect of the invention. Typically, it is desirable to scramble all the data bits in a communications message using a self-synchronizing scrambler so that all points in the signal constellation can be used. Unfortunately, the self-synchronizing capability of the scrambler carries the inherent disadvantage of error propagation and extension. A single bit in error in the received data stream is typically transformed by the self-synchronizing descrambling process into at least 3 erroneous bits that are separated by several bits that are not in error.

Typically, in switched-carrier operation, the scrambler setting (state) at the end of one transmission is preserved and used to begin scrambling the next message. (This enables full randomization of the encoding process so as to make full use of the available channel bandwidth.) Similarly, in a receiving device, when descrambling, the state of the descrambler that exists at the end of the previously received message is used to begin the descrambling process for the next received message. This means that the last state of the scrambler saved after scrambling the data portion of the message would then be used to begin scrambling the preamble bits of the next message.

Unfortunately, using this technique with the robust preamble 40 of the invention can lead to error propagation from the data portion of the communication message to the preamble 40. Allowing errors, which are more likely due to the larger number of bits per symbol, in the payload data to corrupt the data in the preamble due to the inherent error extension of the descrambling process significantly reduces the robustness of the preamble 40. In accordance with another aspect of the invention, a first scrambler can be used to scramble the information contained in the preamble 40 and a second scrambler can be used to scramble the data (i.e., the information in the ATM cells 44, 45, etc.)

As shown in FIG. 5, line 87 indicates that a first scrambler is used to scramble the preamble 40 of communication message 31 and also used to scramble the preamble of communication message 86. Similarly, line 88 indicates that a second scrambler is used to scramble the data portion of communication message 31 and the data portion of communication message 86. The message to message randomizing desirable for full usage of the available channel bandwidth can be maintained if the setting of the preamble scrambler (to be described with respect to FIG. 8) at the end of one preamble is used to begin the scrambling of the preamble of the next communication message 86. Because errors in the preamble are considered unlikely to occur, and because the bits received at the end of a previous preamble define the descrambler state used to descramble the next preamble, error extension from one message preamble into the preamble is also much less likely than in the single scrambler case.

An alternative to this that avoids the use of two scramblers is to save the state of the preamble scrambler after scrambling the preamble as the state to use to begin scrambling of the next preamble. This cab be done instead of the conventional approach of using the state of the scrambler at the end of the message. This technique can also prevent errors at the end of one message from corrupting the preamble of the next transmission.

FIG. 6 is a schematic view illustrating the communication message 31 and the reduced line turn around delay made possible by an aspect of the invention. In time-domain duplex operation any periods during which no transceiver is transmitting represent loss of available bandwidth. To make most efficient usage of a communication line, it is desirable to minimize these periods. Some intervals of silence necessarily occur between transmissions because the transition from silence to the first symbol of the preamble is the manner in which the beginning of the next transmission is delimited. The process by which a transceiver makes the transition from receiving to transmitting is referred to as "line turn-around" and the time required may determine the minimum amount of silence that can occur between messages. Various aspects of the design and implementation of a time-domain duplex transceiver may result in increased delays in the line turn-around process. For example, transmitter filters and receiver equalizers have inherent delays. The analog-to-digital and digital-to-analog conversion process as well as the process of transferring digital samples between the signal processor and converters may have some inherent delays. If the signal processing is implemented in firmware there may be delays between the arrival of received signal samples and the time the processing can be performed. All of these factors may extend the line turn-around time to the point that transmission efficiency is significantly reduced.

As described above with respect to FIG. 3A, communication message 31 includes a specially encoded symbol 60 transmitted at a lower bit per symbol rate than that of the normal data encoding rate. The symbol encodes an additional bit 61 that indicates whether or not the ATM cell is the last cell in the communication message 31. If it is indicated to the receiver at the beginning of the last ATM cell 46 that the ATM cell 46 is the last cell in the communication message, (instead of waiting to the end of the ATM cell 46) line turn around delay can be reduced. As illustrated, if a receiving device must wait until the end of the last message to learn that the message is complete, there will be a delay "d" between the time that the communication message 31 is received and the time at which the transmission of communication message 91a can begin. By having advance notification that the communication message is about to be complete, a remote DSL transceiver 150 can begin transmission of the next message before reception of the current message has been completed. By knowing the delay contributed by the factors such as those mentioned previously, the transceiver can begin the transmission process, indicated by communication message 91b, so as to reduce delay "d" as much as possible, potentially reducing it to the minimum value needed for the receiver to reliably detect the transition-from silence to signal at the beginning of the next message.

FIG. 7 is a block diagram illustrating the control DSL transceiver 100 of FIG. 1. Although, described with respect to control DSL transceiver 100, the following description is equally applicable to a remote DSL transceiver 150. Control DSL transceiver 100 includes microprocessor 101, memory 102, transmitter 115 and receiver 120 in communication via logical interface 108. A bi-directional stream of ATM cells from a DTE is communicated via line 14 to the control DSL transceiver 100. Memory 102 includes end of transmission delimiting software 106 and robust preamble software 104. This software resides in memory 102 and executes in microprocessor 101 in order to achieve and perform the benefits of the present invention. Transmitter 115 communicates with line interface 109 via connection 112 in order to gain access to communication channel 16. Information received on communication channel 16 is processed by line interface 109 and sent via connection 111 to receiver 120.

Transmitter 115 includes, among other elements that are known to those having ordinary skill in the art, encoder 200 and modulator 117. Similarly, receiver 120 includes, among other elements that have been omitted for clarity, decoder 300 and demodulator 118.

FIG. 8 is a block diagram illustrating the encoder 200 of FIG. 7. The transmit sequencer 236 commands the multiplexer 214 via connection 242 to select the first two (2) bits of the four (4) bits (62 of FIG. 3B) that define the current transmit rate from transmit rate element 206, via connection 212. This symbol is then forwarded to preamble scrambler 217, via connection 216 for scrambling, and is then forwarded via connection 218 to two (2) bit per symbol preamble encoder 219. This encoded symbol is then forwarded via connection 226 to gain increase element 227 where its energy is increased by approximately 3 dB and is then sent via connection 228 to multiplexer 224 and over connection 254 to modulator 117.

The next two (2) bits of the transmit rate (62 of FIG. 3B) are then scrambled and encoded in the same way. Next, the transmit sequencer 236 commands the multiplexer 214 via connection 242 to select the four (4) bits representing the requested received rate from receive rate element 204, which bits are forwarded to multiplexer 214 via connection 211. These four (4) bits are then forwarded to preamble scrambler 217 where they are scrambled, and then forwarded via connection 218 to two (2) bit per symbol preamble encoder 219 where they are encoded into a pair of symbols. These encoded symbols, are forwarded directly via connection 226 to multiplexer 224 and then forwarded via connection 254 to modulator 117.

If there are multiple remote DSL transceivers 150 and 155, then the transmit sequencer 236 commands the multiplexer 214 via connection 242 to select the two (2) bits representing the remote address from remote address element 202, which bits are then forwarded via connection 209 to multiplexer 214. These two (2) bits are then forwarded via connection 216 to preamble scrambler 217, which scrambles the bits and forwards them via connection 218 to the two (2) bit per symbol preamble encoder 219. The two (2) bit per symbol preamble encoder 219 encodes the bits and transfers the encoded symbol via connection 226 through multiplexer 224 and then via connection 254 to modulator 117.

Transmit sequencer 236 senses if an administrative header 42 and/or ATM cells 44, 45, 46 are available for transmission via connections 232 and 234, respectively, and uses this information to prepare the message format indicator which is loaded by the transmit sequencer 236 via connection 207. The transmit sequencer 236 commands the multiplexer 214 via connection 242 to select the two (2) bits representing the message format from element 201, which bits are then forwarded via connection 208 to multiplexer 214. These two (2) bits are then forwarded via connection 216 to preamble scrambler 217, which scrambles the bits and forwards them via connection 218 to the two (2) bit per symbol preamble encoder 219. The two (2) bit per symbol preamble encoder 219 encodes the bits and transfers the encoded symbol via connection 226 through multiplexer 224 and then via connection 254 to modulator 117.

Next, transmission of either the administrative header 42 or the ATM cell payload begins by transmit sequencer 236 sending a command via connection 235 to multiplexer 241 to select either the administrative header 42 via element 229 or payload data via element 231. These bits are supplied through multiplexer 241 via connections 239 and 238 and are then forwarded via connection 244 to payload scrambler 246. Payload scrambler 246 scrambles the bits and forwards them via connection 248 to N bit per symbol data encoder 249 and N−1 bit per symbol data encoder 251. As mentioned above with respect to FIG. 5, payload scrambler 246 may use as its initial state either the state that exists at the end of scrambling the preamble (supplied via connection 247) or the state that exists after completion of scrambling the payload portion of the previous message. As mentioned above with respect to FIG. 3A, all the data bits are encoded at an N bit per symbol data rate by data encoder 249 and forwarded via connection 257 to multiplexer 224 until the first symbol containing only bits from a new ATM cell is detected. This symbol is encoded at a rate of N−1 bits per symbol by N−1 bit per symbol data encoder 251 and forwarded via connection 256 to multiplexer 224. The index for this symbol as delivered to payload scrambler 246 is formed by selecting the first N−2 bits of the first octet of the cell and adding an additional bit (i.e., bit 54 or bit 61 of FIG. 3A) representing the state of the last cell signal 237 as selected via multiplexer 241. When instructed by transmit sequencer 236 via connection 252, the multiplexer 224 selects the symbols from either N bit per symbol data encoder 249 or from N−1 bit per symbol data encoder 251 and forwards these symbols via connection 254 to modulator 117.

Transmit sequencer 236 uses the payload bits per symbol value N received via connection 212 to determine the number of symbols to encode for each cell and to determine which symbol is to be encoded at the N−1 bits per symbol rate and contain the last cell indicator bit. After completing transmission of the message, transmit sequencer 236 commands multiplexer 224 via connection 252 to select silence 221 via connection 222 as the input to the modulator 117.

FIG. 9 is a block diagram illustrating the decoder 300 of FIG. 7. A received transmission stream is received in demodulator 118, where it is demodulated in accordance with techniques known those having ordinary skill in the art. The first symbol is forwarded via connection 301 to gain reduction element 302. Gain reduction element 302 reduces the gain of the first symbol and supplies that reduced energy symbol via connection 304 to multiplexer 306. Receive sequencer 328 sends a signal to multiplexer 306 via connection 354 instructing multiplexer 306 to select that reduced gain symbol and transfer it via connection 307 to two (2) bit per symbol preamble decoder 308. The decoded bits from the first symbol are then sent via connection 309 to preamble descrambler 311. Preamble descrambler 311 descrambles the first bits in the transmission and forwards them via connection 312 to the multiplexer 314. When instructed by receive sequencer 328 via connection 332, the multiplexer 314 forwards these bits via connection 324 to transmit rate element 236.

The following preamble symbols are all forwarded via connection 301 directly to multiplexer 306, which forwards these symbols via connection 307 for decoding by two (2) bit per symbol preamble decoder 308. The decoded bits are forwarded via connection 309 to preamble descrambler 311 as mentioned above. These bits are then forwarded in order via connections 324, 321, 318 and 316 to transmit rate element 326, receive rate element 322, remote address element 319 and message format element 317, respectively.

Next, the administrative header symbols and ATM cell data symbols that have been encoded at N bits per symbol are forwarded via connection 301 to N bit per symbol data decoder 337 and the ATM cell data symbols that have been encoded at N−1 bits per symbol are forwarded via connection 301 to N−1 bit per symbol data decoder 339. These symbols are decoded and the decoded bits are transferred via connections 338 and 341 to multiplexer 342. Similarly, as mentioned above with respect to FIG. 8, receive sequencer 328 insures that the symbols encoded at the rate of N−1 bits per symbol are forwarded via connection 301 to N−1 bit per symbol data decoder 339, which forwards the decoded bits via connection 341 to multiplexer 342. As shown, the value of N, which is the bits per symbol value used for the N bits per symbol, or N−1 bits per symbol decoding is controlled by the just received transmit rate bits that have been stored in transmit rate element 326.

At the appropriate time, receive sequencer 328 commands the multiplexer 342 via connection 347 to forward the bits via connection 344 to payload descrambler 336. In accordance with an aspect of the invention, the preamble descrambler 311 operates only on the preamble bits and the payload descrambler 336 operates only on the payload bits. As mentioned above with respect to FIG. 5, the payload descrambler may use as its initial state either the state of the preamble descrambler at the end of descrambling the preamble as supplied via connection 334 or the state of the payload descrambler at the end of descrambling the payload bits of the previous message. The descrambled payload bits are then forwarded via connection 346 to multiplexer 349. When ordered by receive sequencer 328 via connection 331, the multiplexer 349 forwards the administrative header bits via connection 351 and the payload data bits via connection 352. These bits are then forwarded via logical interface 108 to microprocessor 101 for processing (FIG. 7). Receive sequencer 328 determines the presence or absence of the administrative header and ATM cells via the just received message format bits that have been stored in element 317 and provided to receive sequencer 328 via connection 327. When the bits for each symbol containing the last message bit are available at multiplexer 349, receive sequencer 328 directs the N−2 bits of payload data to the payload data element 356 via connection 352 and receives the last cell bit via connection 329. Receive sequencer 328 uses the current bits per symbol value for payload data received via connection 324 to determine the beginning and end of each cell. Based on the message format and the value of the last cell indicator bit, receive sequencer 328 determines when the last symbol of the message has been decoded and instructs demodulator 118 (FIG. 7) to stop delivering demodulated symbols.

In an alternative embodiment, the special encoding of the last cell as described above in FIG. 3A can be omitted and an "eye pattern closure test" can be used to detect the end of the message. In such a situation where it is acceptable to lose the advanced notification of the end of the transmission, beneficial alternative uses for the special encoding of the first bits of each cell are possible. For example, this special encoding as described above with respect to FIG. 3A wherein N−2 bits are encoded for the first full bytes of each cell, can be used to indicate whether or not the ATM cell header (e.g., ATM header 47 of FIG. 2B) is present. This can be useful in the situation in which a string of ATM cells have exactly the same header. This can happen, for example, for ATM adaptation layer 5 (AAL5) cells that carry data from a single protocol data unit (PDU) if no other cells have been interleaved. The single extra bit (bit 61 of FIG. 3A) provided by the encoding described above with respect to FIG. 3A, can be used to indicate whether or not the following cell contains a header. If the bit 61 indicates that there is no header, the receiver copies the last header received ahead of the payload octets of this next cell before forwarding it to the ATM layer. Advantageously, this reduces the approximate 10 percent overhead imposed by the five (5) octet header (47 of FIG. 2B).

It should be emphasized that the above-described embodiments of the present invention, particularly any "preferred" embodiments, are merely possible examples of implementations, merely set forth for a clear understanding of the principles of the invention. Many variations and modifications may be made to the above-described embodiment(s) of the invention without departing substantially from the spirit and principles of the invention. For example, the robust preamble and transmission delimiting system and method are applicable to all switched-carrier transmission methodologies in which it is desirable to reliably convey channel establishment information and reliably delimit the beginning and end of each communication message. All such modifications and variations are intended to be included herein within the scope of the present invention.

Therefore, having thus described the invention, at least the following is claimed:

1. A system for robust transmission delimiting, comprising:
   a communication message including a preamble, the preamble operating to frame the message and to delimit the message from silence, the preamble including a plurality of bits representing communication link control information; and
   an encoder configured to encode the preamble bits into a plurality of symbol indices, the symbol indices encoded at a lower bit per symbol rate relative to the maximum rate capable of being supported over a communication channel.

2. A system for robust transmission delimiting, comprising:
   a communication message including a preamble, the preamble including a plurality of bits representing communication link control information; and
   an encoder configured to encode the preamble bits into a plurality of symbol indices, the symbol indices encoded at a lower bit per symbol rate relative to the maximum rate capable of being supported over a communication channel,
   wherein the preamble includes information that defines a rate at which data following the preamble has been encoded for transmission.

3. The system as defined in claim 2, further comprising a gain boost element configured to increase the energy of the first symbol index to reliably indicate the beginning of the communication message.

4. The system as defined in claim 2, wherein the preamble includes information defining a maximum rate at which a first transceiver that is sending the preamble is able to receive transmissions from a second transceiver that is receiving the preamble.

5. The system as defined in claim 2, wherein the preamble indicates whether a data portion follows the preamble and, if so, the format and type of data that follows the preamble.

6. The system as defined in claim 2, wherein the preamble indicates whether administrative information follows the preamble.

7. The system as defined in claim 5, further comprising:
   a first scrambler configured to scramble the preamble; and
   a second scrambler configured to scramble the data,
   wherein a state of the scrambler used to scramble the bits that comprise the preamble is the state that existed when scrambling of a previous preamble was completed.

8. The system as defined in claim 5, wherein the data portion of the communication message comprises fixed size units, the fixed size units comprising a plurality of bits and wherein the bits are encoded into symbol indices such that, for each of the fixed size units, one symbol index is encoded differently from the other symbols.

9. The system as defined in claim 8, wherein the differently encoded symbol index further comprises an extra bit that indicates whether the fixed size unit from which the other bits of the differently encoded symbol indices are obtained is the last one transmitted in a message.

10. The system as defined in claim 8, wherein the differently encoded symbol index is encoded at a data rate lower than that of the other symbols carrying message data.

11. A system for delimiting the end of a transmission, comprising:
    a communication message segmented into a plurality of fixed size units, each fixed size unit including a plurality of bits; and
    an encoder configured to encode the plurality of bits into a plurality of symbol indices at a first data rate, the encoder also configured to encode at a second rate when producing the first symbol index in the plurality of symbol indices that contains only bits from each fixed size unit, where the second rate is lower than the first rate.

12. A method for robust transmission delimiting, the method comprising the steps of:
    applying a preamble to a communication message, the preamble operating to frame the message and to delimit the message from silence, the preamble including a plurality of bits representing communication link control information; and
    encoding the preamble bits into a plurality of symbol indices, the symbol indices encoded at a lower bit per symbol rate relative to the maximum rate capable of being transmitted over a communication channel.

13. A method for robust transmission delimiting, the method comprising the steps of:
    applying a preamble to a communication message, the preamble including a plurality of bits representing communication link control information;
    encoding the preamble bits into a plurality of symbol indices, the symbol indices encoded at a lower bit per symbol rate relative to the maximum rate capable of being transmitted over a communication channel; and
    including information in the preamble defining a rate at which data following the preamble has been encoded for transmission.

14. The method as defined in claim 13, further comprising the step of increasing the energy of the first symbol index to reliably indicate the beginning of the communication message.

15. The method as defined in claim 13, further comprising the step of including information in the preamble defining a maximum rate at which a transceiver that is sending the preamble is able to receive transmissions from a transceiver that is receiving the preamble.

16. The method as defined in claim 13, further comprising the step of using the preamble to indicate whether a data portion follows the preamble and, if so, the format and type of data that follows the preamble.

17. The method as defined in claim 13, further comprising the step of using the preamble to indicate whether administrative information follows the preamble.

18. The method as defined in claim 16, further comprising the steps of:
    scrambling the preamble using a first scrambler;
    scrambling the data using a second scrambler; and
    scrambling the bits in the preamble using the state of the scrambler that existed when scrambling of the previous preamble was complete.

19. The method as defined in claim 16, wherein the data portion of the communication message comprises fixed size units, the fixed size units comprising a plurality of bits, and wherein the bits that comprise each of the fixed size units are encoded into symbol indices such that for each of the fixed size units, one symbol index is encoded differently from the other symbols.

20. The method as defined in claim 19, further comprising the step of including in said differently encoded symbol index an extra bit that indicates whether the fixed size unit from which the other bits of said differently encoded symbol indices are obtained is the last one transmitted in a message.

21. The method as defined in claim 19, further comprising the step of encoding the differently encoded symbol index at a data rate lower than that of the other symbols carrying message data.

22. A method for delimiting the end of a transmission, the method comprising the steps of:
    segmenting a communication message into a plurality of units, each unit including a plurality of bits and having a fixed size;
    encoding a plurality of the bits in the plurality of units into a plurality of symbol indices, the symbol indices being encoded at a first rate; and
    encoding one symbol index of the plurality of symbol indices at a rate lower than the first rate, the one symbol index containing bits from only one of the plurality of units.

23. A system for robust transmission delimiting, comprising:
    means for applying a preamble to a communication message, the preamble operating to frame the message and to delimit the message from silence, the preamble including a plurality of bits representing communication link control information; and
    means for encoding the preamble bits into a plurality of symbol indices, the symbol indices encoded at a lower bit per symbol rate relative to the maximum rate capable of being transmitted over a communication channel.

24. The system as defined in claim 23, further comprising means for increasing the energy of the first symbol index to reliably indicate the beginning of the communication message.

25. A system for robust transmission delimiting, comprising:
    means for applying a preamble to a communication message, the preamble including a plurality of bits representing communication link control information;
    means for encoding the preamble bits into a plurality of symbol indices, the symbol indices encoded at a lower bit per symbol rate relative to the maximum rate capable of being transmitted over a communication channel; and
    means for including information in the preamble defining a rate at which data following the preamble has been encoded for transmission.

26. The system as defined in claim 25, further comprising means for including information in the preamble defining a maximum rate at which a transceiver that is sending the preamble is able to receive transmissions from a transceiver that is receiving the preamble.

27. The system as defined in claim 25, further comprising means for using the preamble to indicate whether a data portion follows the preamble and, if so, the format and type of data that follows the preamble.

28. The system as defined in claim 25, further comprising means for using the preamble to indicate whether administrative information follows the preamble.

29. The system as defined in claim 27, further comprising:
   means for scrambling the preamble using a first scrambler;
   means for scrambling the data using a second scrambler; and
   means for scrambling the bits in the preamble using the state of the scrambler that existed when scrambling of the previous preamble was complete.

30. The system as defined in claim 27, wherein the data portion of the communication message comprises fixed size units, the fixed size units comprising a plurality of bits; and
   means for encoding the bits that comprise each of the fixed size units into symbol indices such that for each of the fixed size units, one symbol index is encoded differently from the other symbols.

31. The system as defined in claim 30, further comprising means for including in said differently encoded symbol index an extra bit that indicates whether the fixed size unit from which the other bits of said differently encoded symbol indices are obtained is the last one transmitted in a message.

32. The system as defined in claim 30, further comprising means for encoding the differently encoded symbol index at a data rate lower than that of the other symbols carrying message data.

33. A system for delimiting the end of a transmission, comprising:
   means for segmenting a communication message into a plurality of fixed size units, each unit including a plurality of bits;
   means for encoding a plurality of the bits in the units into a plurality of symbol indices, the symbol indices being encoded at a first rate; and
   means for encoding at a second rate when producing the first symbol index in the plurality of symbol indices that contains only bits from each fixed size unit, where the second rate is lower than the first rate.

34. A computer readable medium having a program for robust transmission delimiting, the program comprising logic for performing the steps of:
   applying a preamble to a communication message, the preamble operating to frame the message and to delimit the message from silence, the preamble including a plurality of bits representing communication link control information; and
   encoding the preamble bits into a plurality of symbol indices, the symbol indices encoded at a lower bit per symbol rate relative to the maximum rate capable of being transmitted over a communication channel.

35. The program as defined in claim 34, further comprising logic for performing the step of increasing the energy of the first symbol index to reliably indicate the beginning of the communication message.

36. A computer readable medium having a program for robust transmission delimiting, the program comprising logic for performing the steps of:
   applying a preamble to a communication message, the preamble including a plurality of bits representing communication link control information;
   encoding the preamble bits into a plurality of symbol indices, the symbol indices encoded at a lower bit per symbol rate relative to the maximum rate capable of being transmitted over a communication channel; and
   including information in the preamble defining a rate at which data following the preamble has been encoded for transmission.

37. The program as defined in claim 36, further comprising logic for performing the step of including information in the preamble defining a maximum rate at which a transceiver that is sending the preamble is able to receive transmissions from a transceiver that is receiving the preamble.

38. The program as defined in claim 36, further comprising logic for performing the step of using the preamble to indicate whether a data portion follows the preamble and, if so, the format and type of data that follows the preamble.

39. The program as defined in claim 36, further comprising logic for performing the step of using the preamble to indicate whether administrative information follows the preamble.

40. The program as defined in claim 38, further comprising logic for performing the steps of:
   scrambling the preamble using a first scrambler;
   scrambling the data using a second scrambler; and
   scrambling the bits in the preamble using the state of the scrambler that existed when scrambling of the previous preamble was complete.

41. The program as defined in claim 38, wherein the data portion of the communication message comprises fixed size units, the fixed size units comprising a plurality of bits; and
   wherein the bits that comprise each of the fixed size units are encoded into symbol indices such that for each of the fixed size units, one symbol index is encoded differently from the other symbols.

42. The program as defined in claim 41, further comprising logic for performing the step of including in said differently encoded symbol index an extra bit that indicates whether the fixed size unit from which the other bits of said differently encoded symbol indices are obtained is the last one transmitted in a message.

43. The program as defined in claim 41, further comprising logic for performing the step of encoding the differently encoded symbol index at a data rate lower than that of the other symbols carrying message data.

44. A computer readable medium having a program for delimiting the end of a transmission, the program comprising logic to perform the steps of:
   segmenting a communication message into a plurality of fixed size units, each unit including a plurality of bits;
   encoding a plurality of the bits in the fixed sized units into a plurality of symbol indices, the symbol indices being encoded at a first rate; and
   encoding at a second rate when producing the first symbol index in the plurality of symbol indices that contains only bits from each fixed size unit, where the second rate is lower than the first rate.

45. A method for delimiting the end of a transmission, the method comprising the steps of:
   segmenting a communication message into a plurality of fixed size units, each unit including a plurality of bits;
   encoding the first N bits in a unit into a first symbol index, the first symbol index being encoded at a first rate, N being less than the fixed size; and
   encoding the remaining bits in the plurality of units into a plurality of symbol indices at a rate greater than the first rate.

46. The system as defined in claim 11, further comprising a gain boost element configured to increase the energy of the first symbol index to reliably indicate the beginning of the communication message.

47. The system as defined in claim 11, wherein the preamble indicates whether a data portion follows the preamble and, if so, the format and type of data that follows the preamble.

48. The method as defined in claim 22, further comprising the step of increasing the energy of the first symbol index to reliably indicate the beginning of the communication message.

49. The method as defined in claim 22, further comprising the step of using the preamble to indicate whether a data portion follows the preamble and, if so, the format and type of data that follows the preamble.

50. The system as defined in claims 33, further comprising means for increasing the energy of the first symbol index to reliably indicate the beginning of the communication message.

51. The system as defined in claim 33, further comprising means for using the preamble to indicate whether a data portion follows the preamble and, if so, the format and type of data that follows the preamble.

52. The program as defined in claim 44, further comprising logic for performing the step of increasing the energy of the first symbol index to reliably indicate the beginning of the communication message.

53. The program as defined in claim 44, further comprising logic for performing the step of using the preamble to indicate whether a data portion follows the preamble and, if so, the format and type of data that follows the preamble.

54. The method as defined in claim 45, further comprising the step of increasing the energy of the first symbol index to reliably indicate the beginning of the communication message.

55. The method as defined in claim 45, further comprising the step of using the preamble to indicate whether a data portion follows the preamble and, if so, the format and type of data that follows the preamble.

* * * * *